(No Model.)
J. B. OFFERLE.
BALL CASTER.
No. 528,791. Patented Nov. 6, 1894.
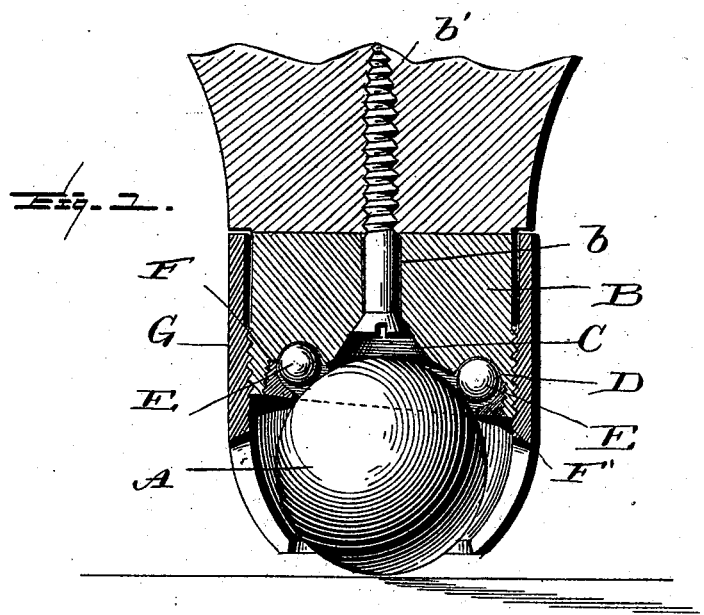
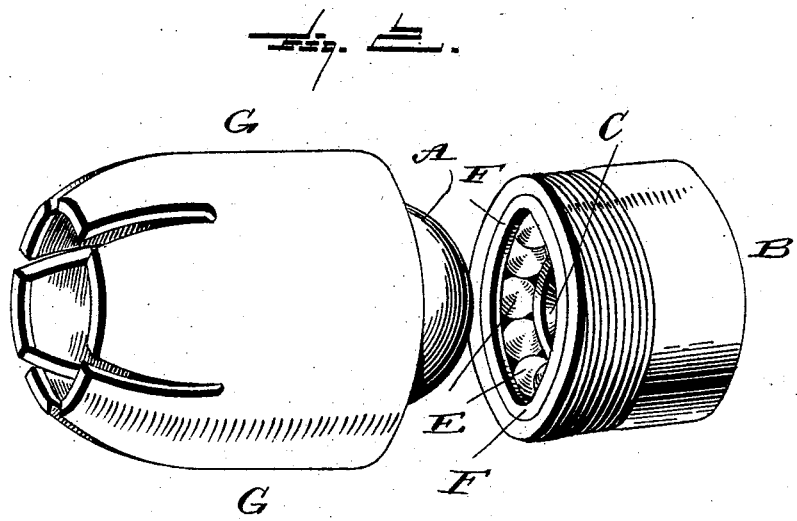
Witnesses:
L. C. Hills.
A. L. Hough
Inventor:
Jacob B. Offerle,
By Franklin H. Hough
Atty.

UNITED STATES PATENT OFFICE.

JACOB BENJAMIN OFFERLE, OF WARREN, PENNSYLVANIA.

BALL-CASTER.

SPECIFICATION forming part of Letters Patent No. 528,791, dated November 6, 1894.

Application filed June 21, 1894. Serial No. 515,273. (No model.)

*To all whom it may concern:*

Be it known that I, JACOB BENJAMIN OFFERLE, a citizen of the United States, residing at Warren, in the county of Warren and State of Pennsylvania, have invented certain new and useful Improvements in Furniture-Casters; and I do declare the following to be a full, clear, and exact description of the invention, such as will enable others, skilled in the art to which it appertains, to make and use the same, reference being had to the accompanying drawings, and to the letters of reference marked thereon, which form a part of this specification.

This invention relates to certain new and useful improvements in roller bearings for articles of furniture and such other articles of a portable nature, and the object sought in the invention is to construct the grooves designed to carry the small bearings, on an angle so that the point of contact between the large ball and the small ones will be thrown off the center; that is having the small bearing balls in a plane at an angle to the floor, instead of in a plane parallel therewith. By this disposition of the small balls, in reference to their positions of contact with the large ball, it is found by experimenting, that the amount of friction is decreased as the one large ball rotates in a horizontal direction, and the said small balls travel around in the groove.

A further object of the invention is in the construction of the casing holding the bearings, being simple in construction with a guide cap having screw threaded connections with the portion carrying the series of balls.

To these ends and to such others as the invention may pertain, the same consists further in the novel construction, combination and adaptation of the parts as will be hereinafter more fully described and then specifically defined in the appended claims.

I clearly illustrate my invention in the accompanying drawings, which with the letters of reference marked thereon form a part of this specification, and in which drawings—

Figure 1 is a vertical section through the caster and bearings. Fig. 2, is a perspective view of the device detached and with its parts separated.

Reference now being had to the details of the drawings by letter A designates the main bearing or roller, which is spherical in form and is seated within the lower portion of a metallic casing G, which casing is preferably made of substantially the form shown, having its lower edges contracted or turned inward for a distance sufficient to permit the article of furniture to which it is attached to be lifted from the floor without danger of releasing the ball A from its seat.

Seated within the upper portion of the case G is a metallic block or casting B, which is secured in place within the casing by screw threads, as shown. The lower end of the block B is concaved and within the side walls of this concaved portion is formed an annular recess F, the said annular recess which is designed to receive a series of smaller balls E, which bear upon the main bearing roller A, the groove being so formed that the balls contained in the groove will have a bearing surface upon the roller at a higher plane upon one side than upon the other. This feature of construction I deem of great importance and consider to be one of the essential features of my invention, as I have found from practical experiment that far better results are obtained than when the groove containing the smaller balls is in a horizontal plane; the inclined guideway for the balls insuring their free rotation at all times and greatly diminishing the friction caused by the sliding of the balls, which is common in a horizontal guideway or groove.

The balls E are held within the groove by means of metallic collar or ring F' which engages screw threads formed in the block B, as shown.

It will be observed that the opening at the lower end of the case G is of sufficient size to permit the free rotation of the roller A without having it contact with the walls of the casing, and it will also be seen that the position of the groove F is such, with reference to the main bearing roller A, as to insure the operativeness of the device without the aid of the casing G, if such construction should for any reason be preferred, the office of the casing being mainly to retain the bearing roller in place when the article of furniture to which the caster is attached is raised from the floor, in moving.

The caster is attached to the furniture leg by means of a screw $b'$ passed upward through a central vertical opening in the block B, as shown, the head of the screw being countersunk in order to insure its being held out of possible contact with the bearing roller.

Having thus described my invention, what I claim to be new, and desire to secure by Letters Patent, is—

The combination with the casing G having its lower edges slit and turned inward, of the large roller seated in the lower portion of the said casing, the block B held in the upper portion of the said casing and having screw threaded engagement therewith, the lower end of the said block being concaved and the side walls of the concaved portion formed with an annular recess F, a series of small balls located in said recess and bearing on the large roller, the said recess being formed at an angle to the horizontal, so that the small balls will have a bearing on the large roller at a higher plane upon one side than at the other, and the ring F' screw threaded and engaging screw threads formed in the block B having rounded upper face.

In testimony whereof I affix my signature in presence of two witnesses.

JACOB BENJAMIN OFFERLE.

Witnesses:
SAML. T. NEILL,
J. W. DUNKLE.